United States Patent
Subburaj et al.

(10) Patent No.: US 8,346,188 B2
(45) Date of Patent: Jan. 1, 2013

(54) NONLINEARITY CALIBRATION SCHEME FOR A FREQUENCY MODULATION TRANSMITTER

(75) Inventors: Karthik Subburaj, Bangalore (IN); Krishnaswamy Nagaraj, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 478 days.

(21) Appl. No.: 12/485,068

(22) Filed: Jun. 16, 2009

(65) Prior Publication Data

US 2010/0075620 A1    Mar. 25, 2010

Related U.S. Application Data

(60) Provisional application No. 61/098,888, filed on Sep. 22, 2008.

(51) Int. Cl.
*H04B 1/62* (2006.01)
(52) U.S. Cl. .......................................... 455/113; 455/147
(58) Field of Classification Search ................... 455/113
See application file for complete search history.

(56) References Cited

U.S. PATENT DOCUMENTS 6,642,869 B2 *  11/2003  Kuyel et al. ................... 341/120
2007/0188243 A1 *  8/2007  Waheed et al. ................. 331/16

FOREIGN PATENT DOCUMENTS

EP        0902483 A1 *  3/1999

* cited by examiner

*Primary Examiner* — Edward Urban
*Assistant Examiner* — Stacey Sorawat
(74) *Attorney, Agent, or Firm* — Ron O. Neerings; Wade J. Brady, III; Frederick J. Telecky, Jr.

(57) ABSTRACT

A nonlinearity calibration system and method for a frequency modulation (FM) transmitter. A nonlinearity calibration system for a FM transmitter includes a digitally controlled oscillator (DCO) with a variable capacitor array. The DCO receives a calibrated fine code for tuning the variable capacitor array to modulate a digitally encoded audio signal transmitted by the FM transmitter to a modulation frequency. The nonlinearity calibration system also includes a nonlinearity estimator for generating an approximation of an integral nonlinearity associated with processing of a fine code to tune the variable capacitor array. The nonlinearity calibration system further includes a subtractor for subtracting the approximation of the integral nonlinearity from the fine code to generate the calibrated fine code.

8 Claims, 6 Drawing Sheets

NONLINEARITY CALIBRATION SCHEME FOR A FREQUENCY MODULATION TRANSMITTER

RELATED APPLICATIONS

This application claims priority under 35 U.S.C. 119 to U.S. Provisional Application No. 61/098,888, entitled "NON-LINEARITY CALIBRATION SCHEME FOR A DIGITALLY CONTROLLED OSCILLATOR" by Texas Instruments, Inc., filed on Sep. 22, 2008, which is incorporated herein its entirety by reference.

TECHNICAL FIELD

Embodiments of the disclosure generally relates to the field of electronics, and more particularly to a frequency modulation (FM) transmitter.

BACKGROUND

A direct modulation type frequency modulation (FM) transmitter is a transmitter without a mixer. The direct modulation type FM transmitter uses a frequency synthesizer to directly modulate a baseband signal (e.g., a digitally encoded audio signal) to a carrier or a central frequency. In order to modulate the baseband signal to a frequency modulated signal, a fine code associated with the baseband signal may be processed by a digitally controlled oscillator (DCO) of the frequency synthesizer to control a variable capacitor array (e.g., a fine array) of the DCO so that an appropriate modulation frequency of the baseband signal can be generated.

However, an integral nonlinearity (INL) may be introduced to the variable capacitor array due to a mismatch in capacitive elements of the variable capacitor array and/or dependence of the modulation frequency to an inductor-capacitor (LC) circuit of the DCO, where the INL may be a term describing a difference between an ideal frequency and actual frequency of the frequency modulated signal. This nonlinearity may in turn affect total harmonic distortion of the baseband signal.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A nonlinearity calibration scheme for a FM transmitter is disclosed. In one aspect, a nonlinearity calibration system for a FM transmitter includes a DCO having a variable capacitor array that receives a calibrated fine code for tuning the variable capacitor array to modulate a digitally encoded audio signal transmitted by the FM transmitter. Further, the nonlinearity calibration system includes a nonlinearity estimator for generating an approximation of an integral nonlinearity (INL) associated with processing of a fine code to tune the variable capacitor array and a subtractor for subtracting the approximation of the INL from the fine code to generate the calibrated fine code.

In another aspect, a FM transmitter includes a frequency synthesizer for generating a frequency modulated signal of a digitally encoded audio signal. The frequency synthesizer includes a DCO, having a variable capacitor array, for receiving a calibrated fine code for tuning the variable capacitor array to generate the frequency modulated signal with a modulation frequency. The FM transmitter further includes a nonlinearity estimator for generating an approximation of an INL associated with processing of a fine code for tuning the variable capacitor array to the modulation frequency, and a subtractor for subtracting the fine code with the approximation of the INL to generate the calibrated fine code.

In yet another aspect, in a method for compensating an INL of a DCO in a direct modulation type FM transmitter, a fine code is received for tuning a variable capacitor array of a DCO of the direct modulation type FM transmitter to generate a frequency modulated transmit signal of a digitally encoded audio signal. An INL associated with processing of the fine code using the variable capacitor array is then determined. Further, a calibrated fine code based on the INL is generated and forwarded to the variable capacitor array to generate the frequency modulated transmit signal.

Other features of the embodiments will be apparent from the accompanying drawings and from the detailed description that follows.

The drawings described herein are for illustration purposes only and are not intended to limit the scope of the present disclosure in any way.

DETAILED DESCRIPTION

A nonlinearity calibration scheme for a frequency modulation (FM) transmitter is disclosed. The following description is merely exemplary in nature and is not intended to limit the present disclosure, applications, or uses. It should be understood that throughout the drawings, corresponding reference numerals indicate like or corresponding parts and features.

The terms "approximation of integral nonlinearity" and "integral nonlinearity approximation" are used interchangeably throughout the document. Also, the terms "frequency modulated signal" and "frequency modulated transmit signal" are used interchangeably throughout the document. Further, the terms "direct modulation type FM transmitter" and "FM transmitter" are used interchangeably throughout the document.

Figure 1:
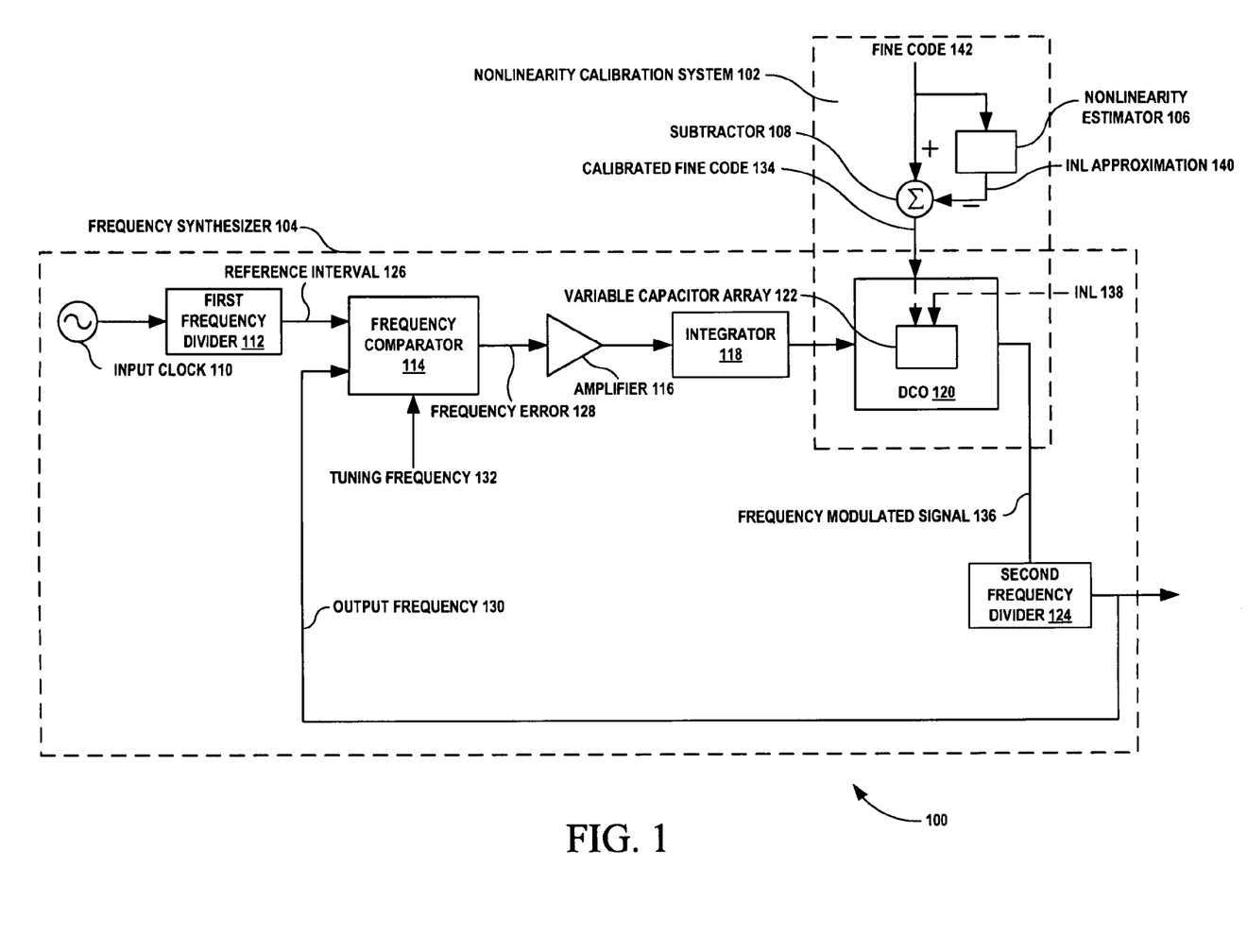
FIG. 1 illustrates a block diagram of an exemplary FM transmitter with a nonlinearity calibration system, according to one embodiment.

FIG. 1 illustrates a block diagram of an exemplary FM transmitter device 100 with a nonlinearity calibration system 102, according to one embodiment. The FM transmitter 100 includes a frequency synthesizer 104, a nonlinearity estimator 106, and a subtractor 108. The frequency synthesizer 104 also includes an input clock 110, a first frequency divider 112, a frequency comparator 114, an amplifier 116, an integrator 118, a digitally controlled oscillator (DCO) 120 having a variable capacitor array 122, and a second frequency divider 124. The DCO 120 with the variable capacitor array 122, the nonlinearity estimator 106 and the subtractor 108 form the nonlinearity calibration system 102.

In operation, the first frequency divider 112 generates a reference interval 126 by dividing a frequency of the input clock 110. In one embodiment, the frequency comparator 114 generates a frequency error 128 by comparing an output frequency 130 of the frequency synthesizer 104 with a tuning frequency 132 (e.g., 92 MHz). In another embodiment, the frequency comparator 114 generates the frequency error 128 for the reference interval 126. The amplifier 116 then amplifies the frequency error 128, and the integrator 118 accumulates the amplified frequency error. The DCO 120 then automatically raises or lowers the frequency of a frequency modulated signal 136 to reduce or eliminate the frequency error 128. For example, if the output frequency 130 is greater than the tuning frequency 132, then the DCO 120 may be operable to lower the output frequency 130 below the tuning frequency 132 to reduce the frequency error 128. On the other hand, if the output frequency 130 is less than the tuning frequency 132, then the DCO 120 may be operable to raise the output frequency 130 above the tuning frequency 132.

The DCO 120 also receives a calibrated fine code 134 for tuning the variable capacitor array 122 to generate the frequency modulated signal 136 of a modulation frequency. In one embodiment, the calibrated fine code 134 compensates for an integral nonlinearity (INL) 138 introduced to the variable capacitor array 122. It is appreciated that the INL 138 may be a term describing a difference between an ideal frequency and actual frequency of the frequency modulated signal 136. In one exemplary implementation, the nonlinearity estimator 106 generates an INL approximation 140 associated with processing of a fine code 142 for tuning the variable capacitor array 122 to the modulation frequency. During the processing of the fine code 142, the fine code 142 may be used to select an appropriate number of capacitor elements in the variable capacitor array 122 to generate the frequency modulated signal 136 of the modulation frequency. The subtractor 108 then subtracts the INL approximation 140 from the fine code 142, where the INL approximation 140 is subsequently used to reduce or nullify the effect of the INL 138 have on the variable capacitor array 122. In this manner, the frequency synthesizer 104 generates the frequency modulated signal 136 of a digitally encoded audio signal (e.g., a baseband signal). Further, the second frequency divider 124 divides the modulation frequency of the frequency modulated signal 136 to generate the output frequency 130.

Figure 2:
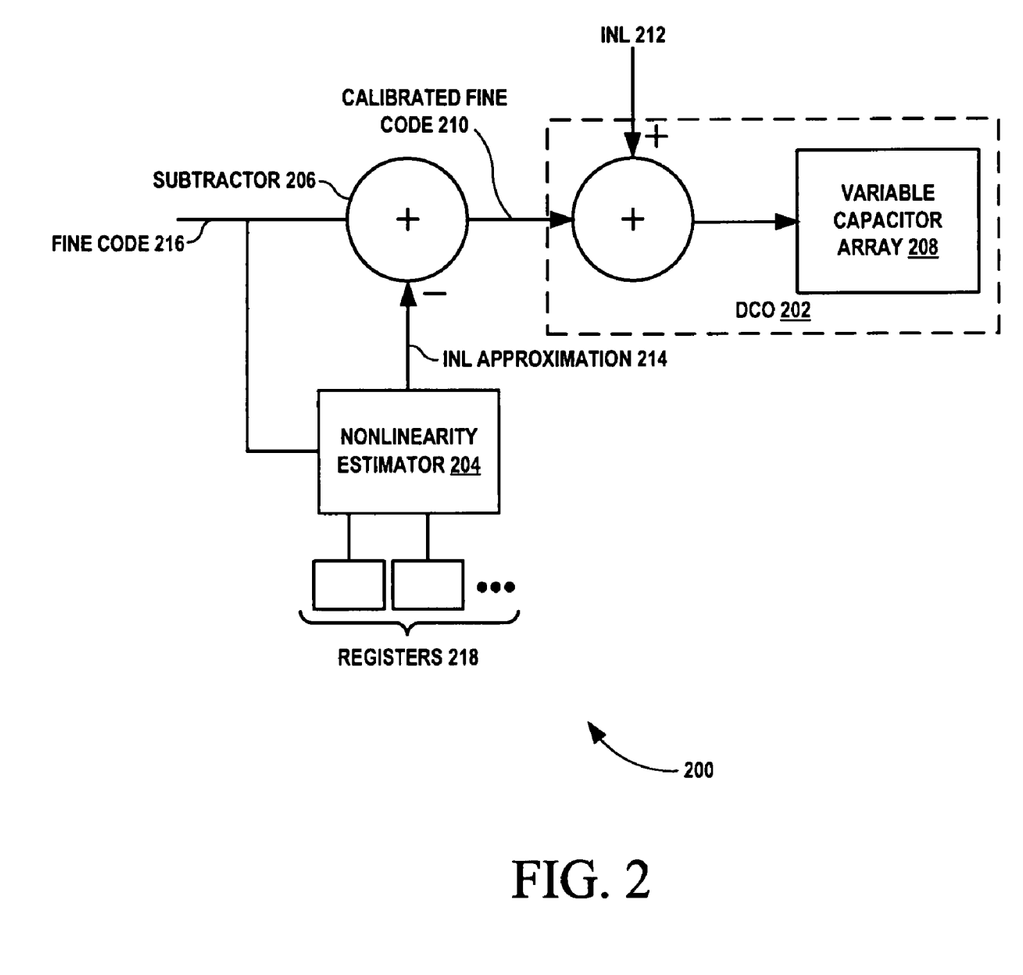
FIG. 2 illustrates a block diagram of an exemplary nonlinearity calibration system for a FM transmitter, according to one embodiment.

FIG. 2 illustrates a block diagram of an exemplary nonlinearity calibration system 200 for a FM transmitter, according to one embodiment. The nonlinearity calibration system 200 includes a DCO 202, a nonlinearity estimator 204 and a subtractor 206. The DCO 202 includes a variable capacitor array 208 which is tuned using a calibrated fine code 210.

In operation, the nonlinearity estimator 204 generates an INL approximation 214 associated with processing of a fine code 216 to tune the variable capacitor array 208. It is appreciated that the fine code 216 may be used to select an appropriate number of capacitor elements in the variable capacitor array 208 to generate a frequency modulated signal of a modulation frequency. The subtractor 206 then subtracts the INL approximation 214 from the fine code 216, where the INL approximation 214 is then used to reduce or nullify the effect of an INL 212 on the variable capacitor array 122. As will be illustrated in details in FIG. 5, the INL approximation 214 may be obtained by interpolating respective INLs of two or more fine codes neighboring the fine code 216. In one exemplary implementation, the INL approximation 214 is stored in a plurality of registers 218. Further, the subtractor 206 subtracts the INL approximation 214 from the fine code 216 to generate the calibrated fine code 210. The DCO 202 then receives the calibrated fine code 210 for tuning the variable capacitor array 208 to modulate a digitally encoded audio signal, such as a moving picture experts group (MPEG) or audio layer X (MPX) format, transmitted by the FM transmitter. Thus, the calibrated fine code 210 compensates the effect of the INL 212 to realize the linear operation of the variable capacitor array 208.

Figure 3:
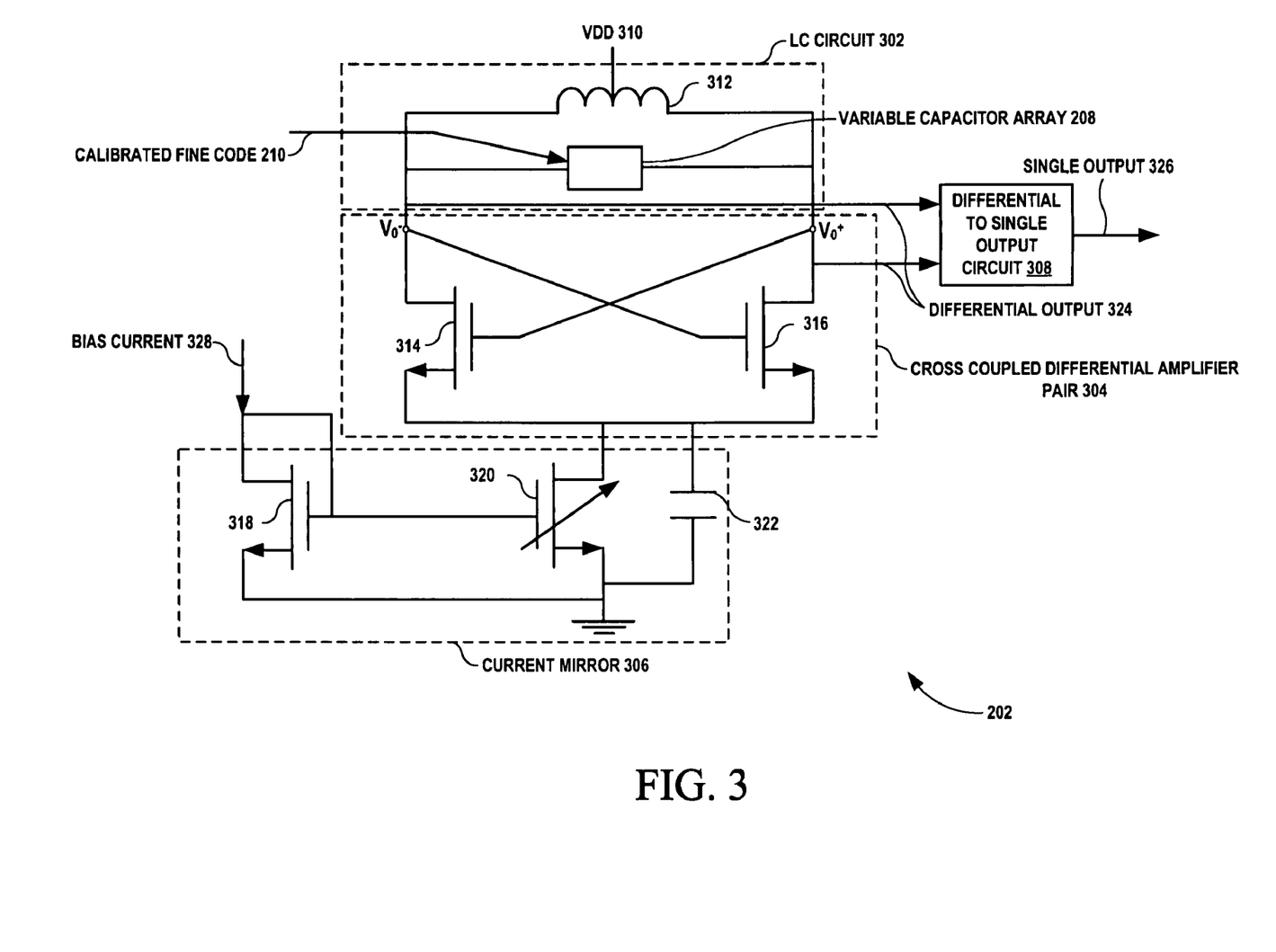
FIG. 3 illustrates an exemplary circuit diagram of the DCO of FIG. 2.

FIG. 3 illustrates an exemplary circuit diagram of the DCO 202 of FIG. 2. The DCO 202 includes an inductor-capacitor (LC) circuit 302 coupled to the positive supply voltage (VDD) 310. The LC circuit 302 includes the variable capacitor array 208 and an inductor 312 connected in parallel.

The DCO 202 also includes a cross coupled differential amplifier pair 304 coupled to the LC circuit 302. The cross coupled differential amplifier pair 304 includes n-type metal oxide semiconductor (NMOS) transistors 314 and 316. Further, the DCO 202 includes a current mirror 306 coupled to the cross coupled differential amplifier pair 304. The current mirror 306 includes a NMOS transistor 318, a variable NMOS transistor 320 and a capacitor 322. Furthermore, the DCO 202 includes a differential to single output circuit 308. In one embodiment, the differential to single output circuit 308 converts a differential output 324 of the DCO 202 to a single output 326. In this embodiment, a bias current 328 is supplied to the current mirror 306 for generating the output 326. In accordance with the abovementioned embodiments, the variable capacitor array 208 is operable to tune a modulation frequency of a frequency modulated signal of the FM transmitter based on the calibrated fine code 210.

Figure 4A:
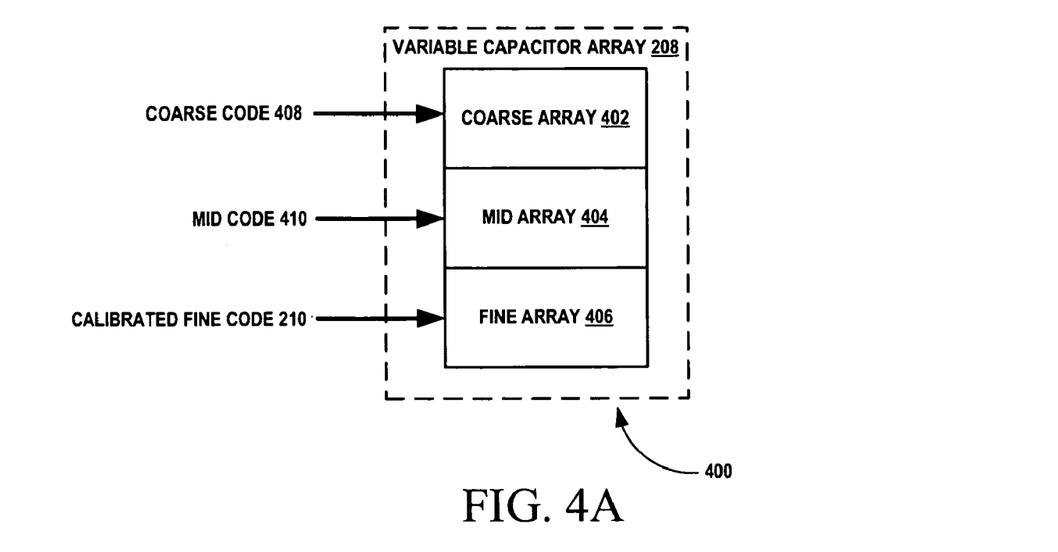
FIG. 4A illustrates a block diagram of an exemplary variable capacitor array for the DCO of FIG. 3.

FIG. 4A illustrates a block diagram 400 of an exemplary variable capacitor array 208 for the DCO 202 of FIG. 3. The variable capacitor array 208 includes a coarse array 402, a mid array 404 and a fine array 406. The coarse array 402 includes large binary coded units, the mid array 404 includes mid size thermometer coded units and the fine array 406 includes small thermometer coded units.

Typically, a coarse code 408 is used for tuning the coarse array 402, a mid code 410 is used for tuning the mid array 404 and the calibrated fine code 210 is used for tuning the fine array 406. The coarse code 408 and the mid code 410 do not change except during initial calibration which occurs every time a new channel is selected. In one embodiment, the fine array 406 is operable to tune the modulation frequency of the frequency modulated signal based on the calibrated fine code 210. In other words, the calibrated fine code 210 covers variations in the DCO 202 due to process, ambient and also due to frequency modulation required by the digitally encoded audio signal.

Figure 4B:
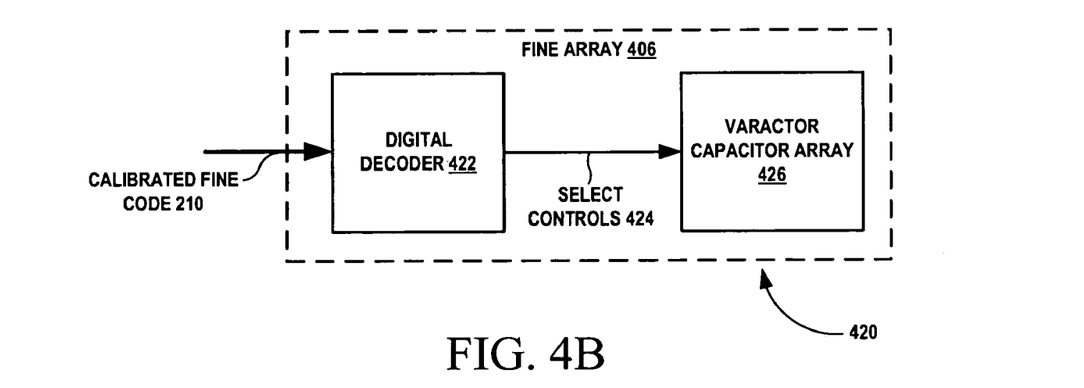
FIG. 4B illustrates a block diagram of exemplary components present in the fine array of FIG. 4A.

FIG. 4B illustrates a block diagram 420 of exemplary components present in the fine array 406 of FIG. 4A. The fine array 406 includes a digital decoder 422 and a varactor capacitor array 426. In one embodiment, the digital decoder 422 generates select controls 424 by decoding the calibrated fine code 210, which may be represented in multiple bits. In this embodiment, the varactor capacitor array 426 tunes the modulation frequency of the frequency modulated signal by controlling operations of varactor capacitor elements based on the select controls 424.

Figure 4C:
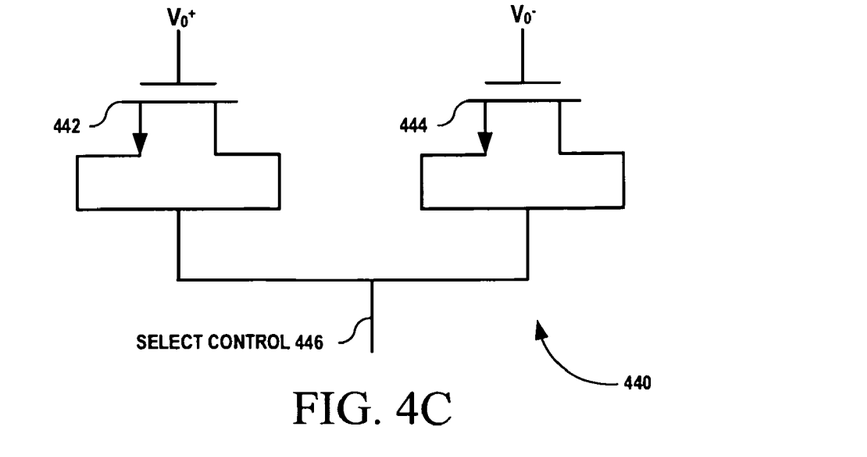
FIG. 4C illustrates an exemplary varactor capacitor element of the variable capacitor array of FIG. 4B.

FIG. 4C illustrates an exemplary varactor capacitor element 440 of the variable capacitor array 426 of FIG. 4B. The varactor capacitor element 440 includes NMOS transistors 442 and 444 connected to $V_O+$ and $V_O-$ nodes of the differential output 324 of the DCO 202 respectively. The varactor capacitor element 440 is turned on to generate a capacitance if a respective select control (e.g., the select control 424) is low. Alternatively, when the select control for the varactor capacitor element 440 is high, the varactor capacitor element 440 is turned off.

Figure 5:
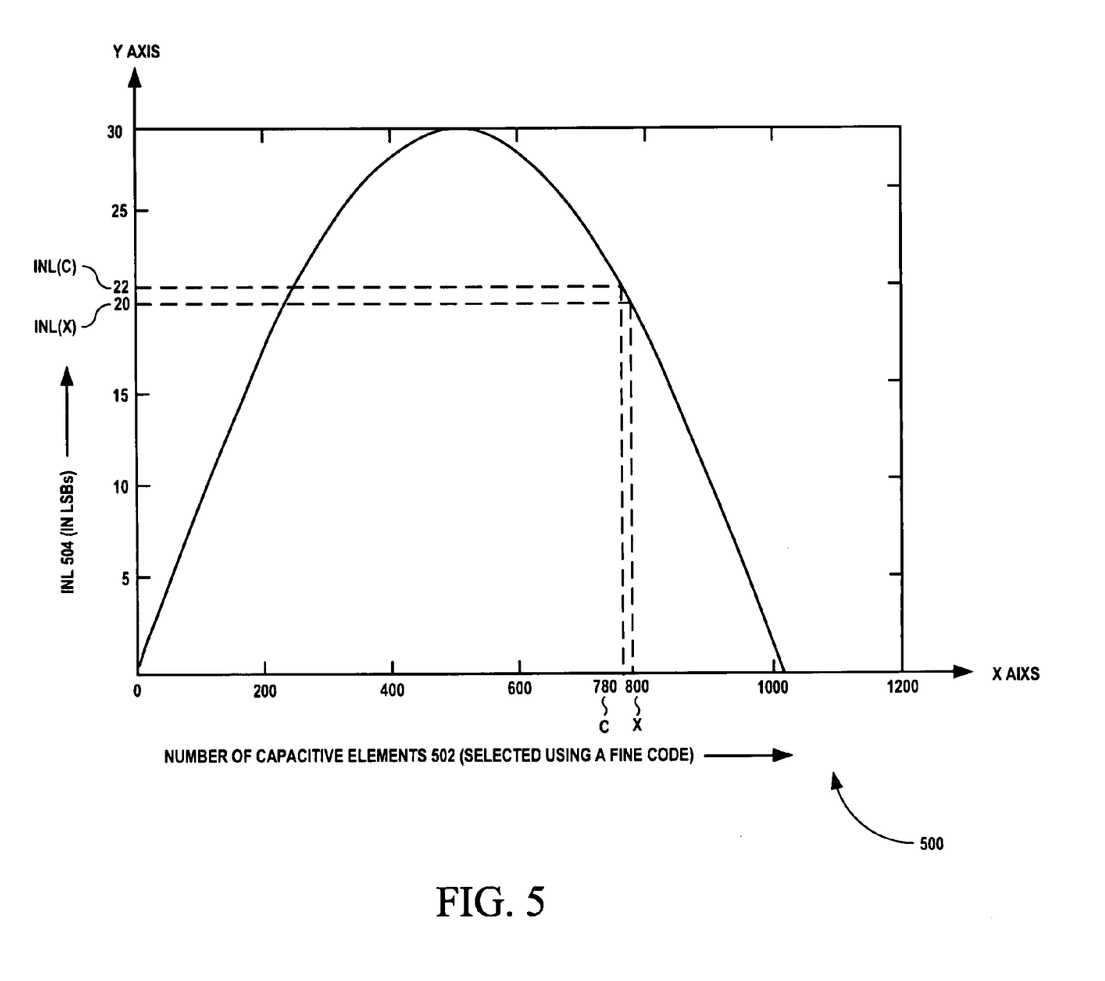
FIG. 5 illustrates a graph showing integral nonlinearities among fine codes.

FIG. 5 illustrates a graph 500 showing integral nonlinearities among fine codes. X-axis represents a number of capacitor elements 502 and Y-axis represents an INL among the fine codes in least significant bits (LSBs), where each LSB may represent a capacitor element. Each fine code is used to select the number of capacitor elements 502 in the variable capacitor array 208 of the DCO 202 of the FM transmitter. In one embodiment, a fine code is received for tuning the variable capacitor array 208 to generate a frequency modulated transmit signal of a digital encoded audio signal. In one example embodiment, the INL may be determined by calculating a difference between an actual frequency and an ideal frequency of the frequency modulated transmit signal at the fine code. In another example embodiment, the INL may be determined by interpolating the INL using a plurality of fine codes neighboring the fine code and their respective INL values during a calibration process of the variable capacitor array 208.

The graph 500 shows an INL associated with the processing of the fine code, where the INL may be generated based on a difference between an actual frequency and an ideal frequency of the frequency modulated transmit signal at the fine code. The INL is determined or approximated using a plurality of fine codes neighboring the fine code and their respective INL values obtained during a calibration process of the variable capacitor array 208.

In one embodiment, the calibration process includes measuring output frequencies for uniformly spaced fine codes (e.g., 0, 16, 32, 48, 64 and so on), and determining a global slope (GS) by dividing a total range of the output frequencies by a total range of the uniformly spaced fine codes. The calibration process further includes determining respective INL values for the uniformly spaced fine codes by dividing a difference between each output frequency and its ideal output frequency by the GS. In one example embodiment, the ideal output frequency is approximated using the GS. The calibration process also includes storing the INL values associated with the uniformly spaced fine codes in the plurality of registers 218. Storing the INL values in the plurality of registers 218 eliminates the need for performing additional computations during a normal operation.

If a first respective INL value associated with a first fine code is unavailable in the plurality of registers 218, then the first respective INL value is interpolated using two of the uniformly spaced fine codes flanking the first fine code and their respective INL values stored in the plurality of registers 218. In one embodiment, the first respective INL value associated with the first fine code is interpolated using the equation:

$$INL(x) = (x - X1)\frac{[INL(X2) - INL(X1)]}{(X2 - X1)} + INL(X1),$$

where, x is the first fine code, X1 and X2 are the two of the uniformly spaced fine codes, INL(X1) and INL(X2) are their respective INL values.

Then, a calibrated fine code is generated based on the INL. In one embodiment, the calibrated fine code is calculated by subtracting a nonlinearity associated with the fine code from the fine code. In another embodiment, the calibrated fine code is further refined by subtracting a nonlinearity associated with the calibrated fine code from the fine code. It can be noted that the refinement of the calibrated fine code can be used for large values of INL, where the calibrated fine code is significantly different from the fine code. Moreover, the calibrated fine code is forwarded to the variable capacitor array 208 to generate the frequency modulated transmit signal of the digitally encoded audio signal.

For example, let fine code (x) received for tuning the variable capacitor array 208 be 800. Further, an INL associated with processing of the fine code (x) is 20 LSBs, i.e., INL(x) =20 LSBs. Then, a calibrated fine code (c) is calculated by subtracting the INL (i.e., INL(x)) from the fine code (x), i.e., c=x−INL(x)=800−20=780. Further, actual fine code (y) is calculated using the equation:

$$y=c+\mathrm{INL}(c),$$

where INL(c) is the INL associated of the DCO 208 in the direct modulation type FM transmitter. From the graph 500, the INL(c) is 22 LSBs.

Therefore, y=780+22=802. It can be noted that, the actual fine code (y) obtained is not equal to the fine code (x) (i.e., 800) and there is an uncorrected residue of 2 LSBs. Thus, the calibrated fine code (c) needs to be further refined.

The refined calibrated fine code (c') is calculated by subtracting the nonlinearity (i.e., INL (c)) associated with the calibrated fine code (c) from the fine code (x), i.e., c'=x−INL(c)=800−22=778. Since, c' is very close to c, INL(c') =INL(c)=22. Therefore, by using the refining technique, the actual fine code (y) is obtained using the equation: (y)=c'+INL(c'), i.e., y=778+22=800. Hence, the actual fine code (y) obtained using the refining technique is equal to the fine code (x) for tuning the variable capacitor array 208. In this manner, the nonlinearity calibration system 200 compensates for the INL of the DCO 208.

In one embodiment, the above two step process of first determining INL(c) and then INL(c') for the actual fine code (y) can be performed every time a fine code (x) is received during the normal operation of the direct modulation type FM transmitter. Alternatively, the two step process can be carried out for a limited number of uniformly spaced fine codes (e.g., 0, 16, 32, 48, 64 and so on) and store the respective values of INL(c') in the plurality of registers 218. Thus, during the normal operation, the value of INL(c') for an arbitrary fine code (x) is interpolated using the two uniformly spaced fine codes flanking the arbitrary fine code (x).

Figure 6:
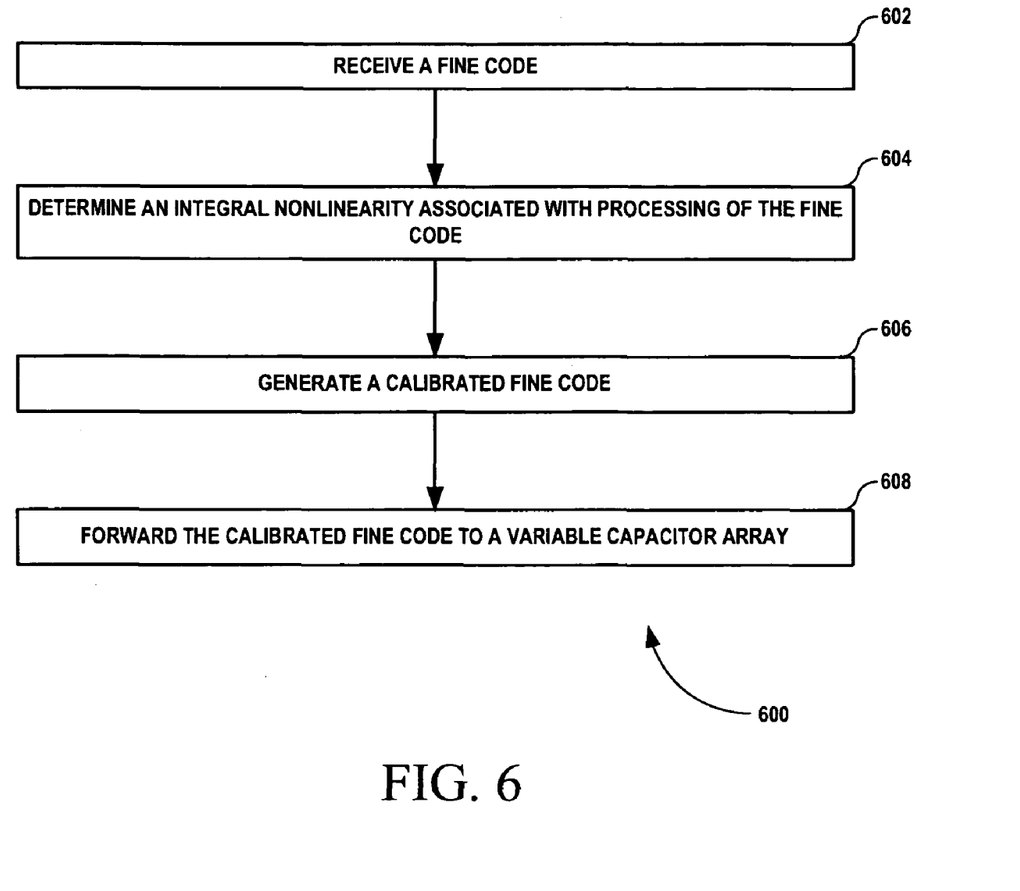
FIG. 6 illustrates a flow diagram of an exemplary method for compensating an INL of a DCO in a direct modulation type FM transmitter, according to one embodiment.

FIG. 6 illustrates a flow diagram 600 of an exemplary method for compensating an INL of a DCO in a direct modulation type FM transmitter, according to one embodiment. In operation 602, a fine code is received for tuning a variable capacitor array of the DCO of the direct modulation type FM transmitter to generate a frequency modulated transmit signal of a digitally encoded audio signal. For example, as illustrated in FIG. 1, the fine code 142 is applied as an input to the variable capacitor array 122 of the DCO 120 to generate the frequency modulated transmit signal 136 of a digitally encoded audio signal. In operation 604, an INL associated with processing of the fine code is determined using the variable capacitor array. For example, the INL 138 may be determined or approximated as the INL approximation 140 using the variable capacitor array 122. The INL 138 may be determined by using at least two fine codes neighboring the fine code 142 and their respective INL values during a calibration process of the variable capacitor array 122. In operation 606, a calibrated fine code is generated based on the INL. For example, the calibrated fine code 134 is generated by compensating the INL 138 with the INL approximation 140. In operation 608, the calibrated fine code is forwarded to the variable capacitor array to generate the frequency modulated transmit signal. For example, the calibrated fine code 134, which has a minimal or reduced INL, is processed by the variable capacitor array 122 to generate the frequency modulated transmit signal 136.

The above-described nonlinearity calibration scheme compensates for the INL of the DCO of the direct modulation type FM transmitter by calibrating the fine code prior to forwarding to the DCO. This helps achieve low total harmonic distortion (THD) audio requirement (e.g., −50 dB) in the direct modulation type FM transmitter.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A frequency modulation transmitter comprising: a frequency synthesizer for generating a frequency modulated signal of a digitally encoded audio signal, wherein the frequency synthesizer further comprises a digitally controlled oscillator having a variable capacitor array that receives a calibrated fine code for tuning the variable capacitor array to generate the frequency modulated signal with a modulation frequency;
   a nonlinearity estimator for generating an approximation of an integral nonlinearity associated with processing of a fine code for tuning the variable capacitor array to the modulation frequency; and
   a subtractor for subtracting the fine code with the approximation of the integral nonlinearity to generate the calibrated fine code, wherein the nonlinearity estimator calculates nonlinearity associated with the calibrated fine code and subtracts the nonlinearity associated with the calibrated fine code from the fine code to refine the calibrated fine code that is provided to the digitally controlled oscillator, wherein the frequency synthesizer further comprises:
   a first frequency divider for generating a reference interval by dividing a frequency of an input clock;
   a frequency comparator for generating a frequency error by comparing an output frequency of the frequency synthesizer with a tuning frequency;
   an amplifier for amplifying the frequency error;
   an integrator for accumulating the frequency error, wherein the frequency error is processed by the digitally controlled oscillator to correct the frequency error; and
   a second frequency divider for dividing the modulation frequency of the frequency modulated signal.

2. The transmitter of claim 1, wherein the variable capacitor array comprises a coarse array, a mid array, and a fine array, and wherein the fine array is operable to tune the modulation frequency based on the calibrated fine code.

3. The transmitter of claim 2, wherein the fine array comprises:
   a digital decoder for generating select controls by decoding the calibrated fine code; and
   a varactor capacitor array for tuning the modulation frequency by controlling operations of varactor capacitor elements based on the select controls.

4. The transmitter of claim 3, wherein the calibrated fine code is based on a plurality of bits.

5. The system of transmitter 3, wherein the variable capacitor array comprises a plurality of varactor capacitor elements.

6. The transmitter of claim 1, wherein the digitally encoded audio signal is in a moving picture experts group (MPEG) format.

7. The transmitter of claim 1, wherein the digitally encoded audio signal is in audio layer X (MPX) format.

8. The transmitter of claim 1, further comprising a plurality of registers for storing the approximation of the integral nonlinearity.

* * * * *